United States Patent
Ackermann et al.

(10) Patent No.: US 6,389,678 B1
(45) Date of Patent: May 21, 2002

(54) METHOD OF CONSTRUCTING A SALIENT POLE MOTOR

(75) Inventors: Daniel E. Ackermann; Vernon E. Kieffer, both of St. Louis County, MO (US)

(73) Assignee: Emerson Electric Co., St. Louis, MO (US)

( * ) Notice: Subject to any disclaimer, the term of this patent is extended or adjusted under 35 U.S.C. 154(b) by 0 days.

(21) Appl. No.: 08/656,082

(22) Filed: May 31, 1996

(51) Int. Cl.[7] .............................................. H02K 15/00
(52) U.S. Cl. ........................................................ 29/596
(58) Field of Search ........................ 29/596, 598, 732, 29/734, 736

(56) References Cited

U.S. PATENT DOCUMENTS

| | | | |
|---|---|---|---|
| 3,157,939 A | * 11/1964 | Balke | 29/596 |
| 3,229,134 A | * 1/1966 | Rakula | 29/596 |
| 3,634,707 A | 1/1972 | Tillner et al. | |
| 3,714,973 A | * 2/1973 | Kieffer et al. | 29/596 |
| 3,748,714 A | 7/1973 | Kieffer | |
| 4,357,968 A | 11/1982 | Kieffer | |
| 4,644,211 A | 2/1987 | Idogaki et al. | |
| 4,712,038 A | 12/1987 | Forbes et al. | |
| 4,750,258 A | * 6/1988 | Anderson | 29/596 |
| 4,835,839 A | 6/1989 | Forbes et al. | |
| 4,851,758 A | 7/1989 | Osada et al. | |
| 4,901,433 A | * 2/1990 | Barrera | 29/596 |
| 5,168,187 A | 12/1992 | Baer et al. | |

FOREIGN PATENT DOCUMENTS

| | | |
|---|---|---|
| GB | 2196489 | 7/1990 |
| JP | 59132742 | 7/1984 |
| JP | 1308150 | 12/1990 |

* cited by examiner

*Primary Examiner*—Joseph J. Hail, III
(74) *Attorney, Agent, or Firm*—Thompson Coburn LLP

(57) ABSTRACT

This invention relates in general to dynamoelectric machines, and in particular to a method of fabricating a low cost salient pole stator assembly for a salient pole motor. Low cost salient pole motors are constructed by minimizing stator core stack height or core stack material and maximizing winding slot fill in the motor design process. Thereafter, the windings for the motor design are formed externally of the motor on high speed winding machines and transferred to axial insertion devices. Transfer to the axial insertion devices may be either accomplished automatically or manually. Thereafter, the windings are axially inserted into the stator core. After insertion, the salient pole stator assembly generally is processed like a conventional distributed winding induction motor.

34 Claims, 6 Drawing Sheets

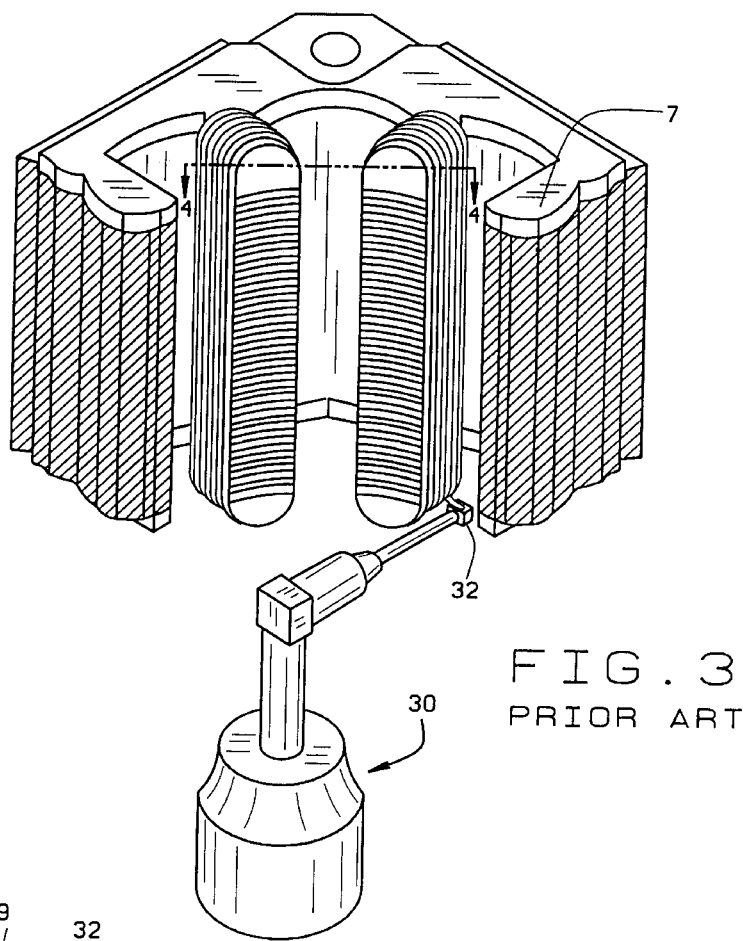
FIG. 3
PRIOR ART
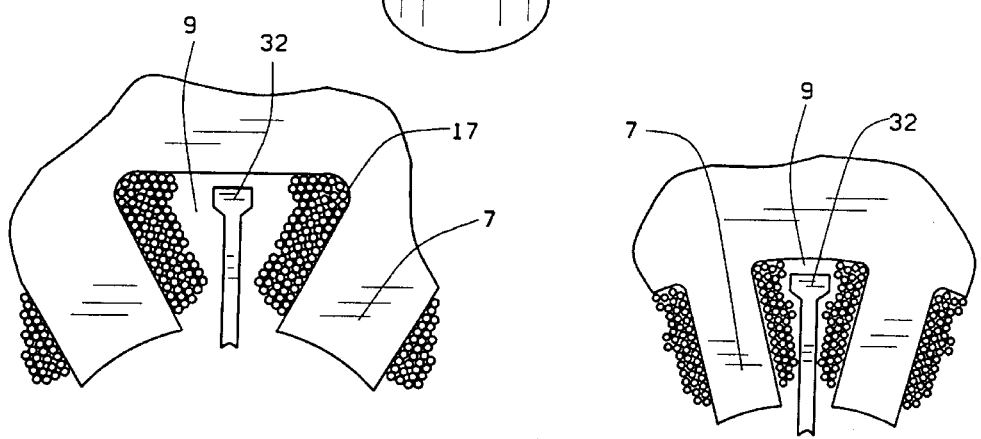
FIG. 4A
PRIOR ART
FIG. 4B
PRIOR ART

METHOD OF CONSTRUCTING A SALIENT POLE MOTOR

BACKGROUND OF THE DISCLOSURE

This invention relates to a method of constructing salient pole stator assemblies for dynamoelectric machines. Salient pole motors in various forms have been available for many years. In the past, salient pole motors found general applications in stepper motors. As will be appreciated by those skilled in the arts, stepper motors are used in applications where precise control of rotor location is required. More recently, salient pole motor designs are finding application in both brushless permanent magnet motors and switched reluctance motors.

One of the differences between a brushless permanent magnet motor and a switched reluctance motor concerns the rotor construction. Both switched reluctance and brushless permanent magnet motors include a stator assembly and a rotor assembly. The rotor assembly of the brushless permanent magnet motor has at least one permanent magnet associated with it. Electrical energy is applied to the windings sequentially to drive the motor according to a desired function. The rotor of a switched reluctance motor eliminates the use of magnets. That is to say, it conventionally is constructed from a plurality of individual laminations formed from ferromagnetic material which are joined to one another by conventional means. No magnets are employed with the rotor. Again, the rotor follows the application of electrical energy to the windings according to the predetermined order of that electrical energy application.

Induction motors having distributed windings also have been known since antiquity. Induction motors conventionally have the turns of a winding pole distributed over the predetermined number of teeth of the stator core. For example, the stator core may also be constructed from a plurality of individual laminations. The laminations commonly have a central bore opening formed in them, and radially outwardly extending winding receiving slots which open on the bore. The material between the winding receiving slots are commonly known as teeth. The windings are distributed over three, five, and seven teeth, for example, the distribution permitting improved performance for the induction motor.

Salient pole machines also are employed in conventional dc motors. Salient pole windings have all the turns of the motor pole in one winding group generally spanning a single tooth of the stator core. Both brushless permanent magnet motors and switched reluctance motors operate similarly to a conventional dc motor, except that the physical commutator of a dc motor is replaced by an electronic control circuit. The electronic control circuit provides electrical and commutation to the windings so that the rotor performs in a desired matter.

Construction of a stator assembly for distributed windings and salient pole windings in general have developed along three paths. Induction machines now are commonly wound on machines where the turns of a winding coil are manufactured by extremely high speed machines and transferred, either manually or automatically, to an axial insertion device. In the alternative, the windings may again be wound on high speed winding machines, and transferred to a winding transfer tool for later manual placement on the axial insertion device. Apparatus of the latter type are described in U.S. Pat. No. 3,714,973, the disclosure of which is incorporated herein by reference.

Salient pole winding machines, on the other hand, generally have windings constructed by two methods. The individual poles are wound on plastic bobbins, for example, and the individual bobbins are placed over the teeth of an associated stator assembly. In the alternative, oscillating gun type winders are employed to wind the salient pole directly on the stator core. While both salient pole winding construction methods work for their intended purpose, they are characterized by relatively slow winding speeds, especially when compared to induction motor distributed winding techniques, and have poor slot fills because both the bobbin and the oscillating gun require considerable space in the slots in order to function properly. As will be appreciated by those skilled in the art, the term slot fill, for the purpose of this Specification, means the area of the slot available for the winding divided into the area occupied by the number of turns of the winding in that slot. Induction motor slot fills in the vicinity of slot fills approaching 70% are common. Slot fills for salient pole windings commonly are 40%–50%. While bobbin and oscillating guns also have been employed with more conventional induction motors, axial insertion of for salient pole motors was not considered feasible because salient pole motors, particularly switched reluctance and brushless permanent magnet motors, are generally characterized by relatively long stack heights and short end turn winding designs.

Motor designers have two basic techniques for matching motor performance to a particular intended application of the motor. Motor stack height can be increased while winding turns are reduced because the mix of active material, that is to say, the steel and copper producing the associated motor flux, can be equalized by that technique. Conversely, motor turns can be added and steel removed to accomplish a similar result. Again, as will be appreciated by those skilled in the art, copper unit costs are considerably higher than steel unit costs. Conventional motor design wisdom suggests that adding copper turns and end turn length to a motor design (thereby substituting increasing copper cost for the motor) will not improve overall motor costs. When additional turns were added to motor designs in the past, and the steel or stack height decreased to obtain equivalent performance motors, the motor design choice often occurred because of two reasons: (i) space requirements in a particular application required reduced overall motor length, and (ii) the motor's original design was so uneconomical that a cost reduction inevitably resulted with the redesign; as opposed to a method of providing a lower cost construction technique of a motor originally designed to proper electrical and mechanical specifications. In general, copper costs far exceed lamination steel costs per pound, so that a reasonable motor designer seeking to achieve a low cost motor construction for a motor having proper design characteristics would not substitute copper for steel in a motor design where low cost is the objective. That is to say, motors in general and salient pole motors in particular are presently designed for economical production because the motors are already designed to work the active material of the motor at or near its electrical capacity. Once an economic design is achieved, it is not logical to believe that the substitution of a high cost material for a low cost material will reduce product cost.

We have found that contrary to conventional motor construction maxims, low cost salient pole motors can be produced (for even previously properly designed motors) by techniques that reduce the stator core active material, either by reducing lamination size, with or without additional winding turns but, in any event, by increasing slot fill for the motor design; or by thereafter substantially increasing the turns per pole, substantially decreasing motor stack height; and constructing the winding externally of the stator assembly, and axially inserting the winding into position on the stator assembly.

SUMMARY OF THE INVENTION

One of the objects of this invention is to provide a method of constructing a low cost salient pole motor design.

Another object of this invention is to provide a salient pole motor design which enables the salient poles to be axially inserted into position on the stator core;

Another object of this invention is to provide a salient pole motor having relatively high slot fills;

Another object of this invention is to provide a salient pole motor in which conventional insulation techniques may be employed with the stator core of the motor;

Another object of this invention is to provide a method of constructing a salient pole motor in which the windings are automatically transferred to an axial insertion machine;

Still another object of this invention is to provide a method of constructing a salient pole motor in which the windings are transferred to a winding transfer tool for later positioning on an axial insertion machine.

Yet another object of this invention is to provide improved heat transfer capabilities of salient pole motors employed in applications where positive air flow techniques are not commonly employed.

Other objects of this invention will be apparent to those skilled in the art in light of the following description and accompanying drawings.

In accordance with this invention, generally stated, a low cost construction method for salient pole motors is unexpectedly provided by reducing the ferromagnetic content of the motor and increasing the magnet wire content of the winding.

In one preferred form of the invention, the electrical performance for the motor in its intended use is determined. Thereafter, the motor design is accomplished by providing a core stack height that approaches the minimum stack height while the slot fill of the windings approaches the maximum slot fill for the lamination design utilized for the stator core. In another preferred form of the invention, the stator core lamination size is reduced while the slot fill for the winding is increased.

In all embodiments, the winding is wound externally of the stator core, and transferred to an axial insertion device. After core placement, the salient pole winding is axially inserted into the core.

In another form of the invention, the winding is wound externally of the motor and placed on a suitable transfer tool, where it is stored until use. The winding thereafter is moved from the transfer tool to the axial insertion device.

In another form of the invention, the winding, after being formed externally of the stator core, is automatically positioned on the axial insertion device.

BRIEF DESCRIPTION OF THE DRAWINGS

In the drawings.

FIG. 3 is a sectional view, partly broken away, of a second illustrative prior art salient pole stator core and winding design;

FIGS. 4a and 4b are diagrammatic views illustrating slot fill characteristics of the stator assembly wound in accordance with the method of FIG. 3;

DESCRIPTION OF THE PREFERRED EMBODIMENT

Figure 5:
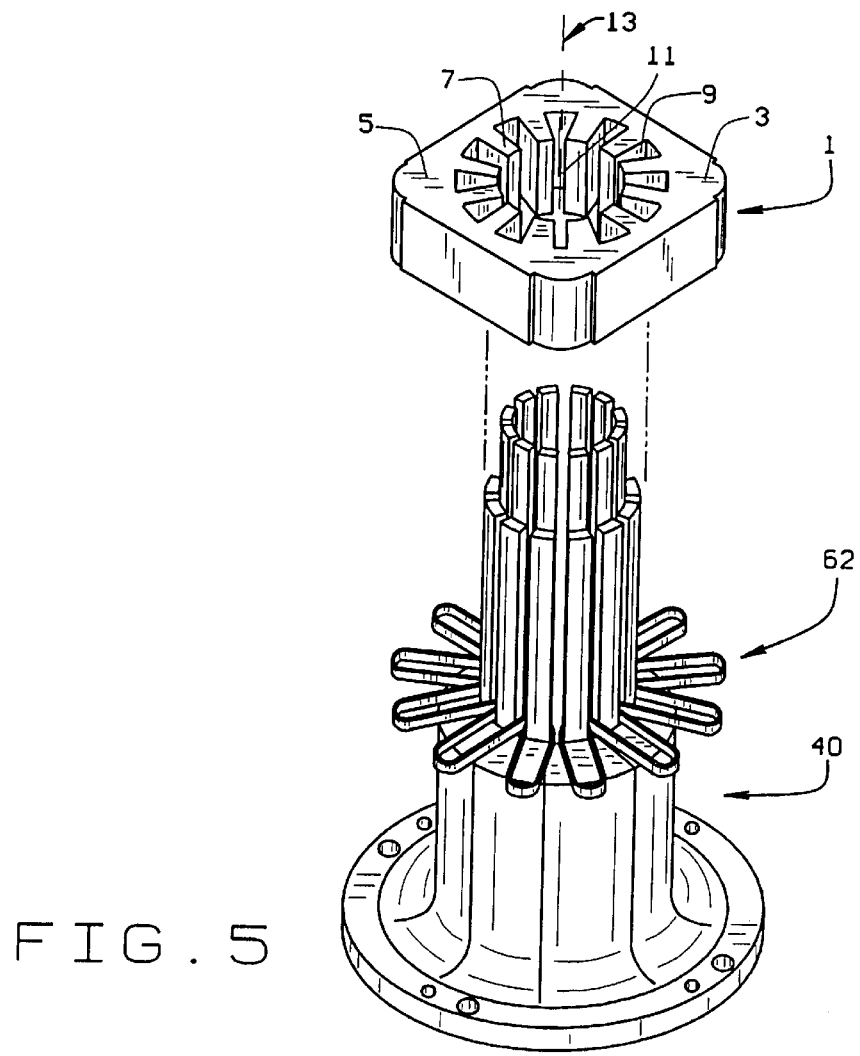
FIG. 5 is one illustrative embodiment of a method of axially inserting the salient pole windings into a stator core.

Referring first to FIG. 5, reference numeral 1 indicates a stator core for a stator assembly of a salient pole machine. The stator core 1 conventionally is constructed from a plurality of individual laminations 3. Each lamination 3 includes a yoke 5 having a plurality of teeth 7 extending radially outwardly of the yoke 5. In the assembled relationship of the laminations 3, the teeth 7 define winding receiving slots 9 and, in the embodiment illustrated, an axially extending rotor receiving bore 11. The bore 11 has a central axis 13. The rotor used in conjunction with the stator core 3 for the motor of the present invention is conventional, and is not illustrated for drawing simplicity. The embodiment shown in FIG. 5 is designed to have the rotor position internally of the yoke 5. As will be appreciated by those skilled in the art, salient pole motors often have inside out constructions in which the rotor is positioned outboard of the yoke 5. Either type of motor construction is compatible with our invention.

Figure 1:
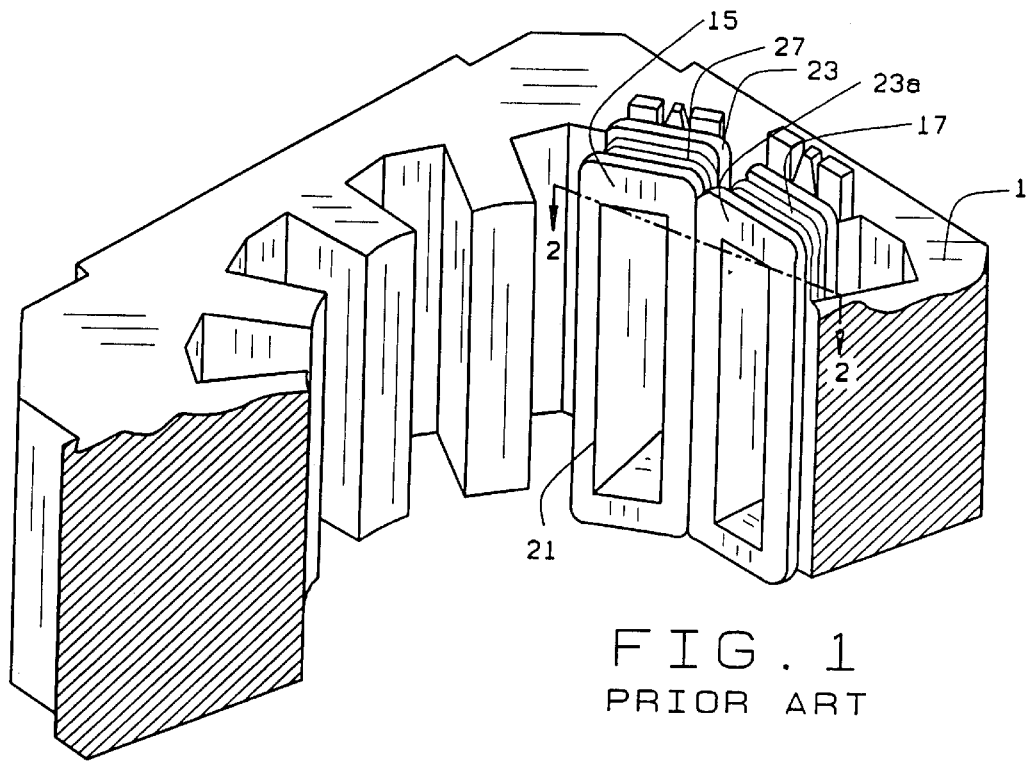
FIG. 1 is a view in perspective, partly broken away, of a prior art salient pole stator core and winding design.

As indicated above, prior to our invention, salient pole motors were constructed in one of two ways. Referring now to FIG. 1, which is labeled prior art, an illustrative embodiment of one such construction method is shown partly broken away. The construction of the stator core 1 is similar to that described with our invention, and is not described in detail. However, the embodiment of FIG. 1 includes a plurality of bobbins 15 which are intended to hold a plurality of winding turns 17. The winding turns 17 are constructed from any suitable magnet wire material. Magnet wire conventionally includes an electrically conductive coil coated with one or more layers of insulative material. Both copper and aluminum, or alloys thereof, commonly are used as core materials.

Figure 2:
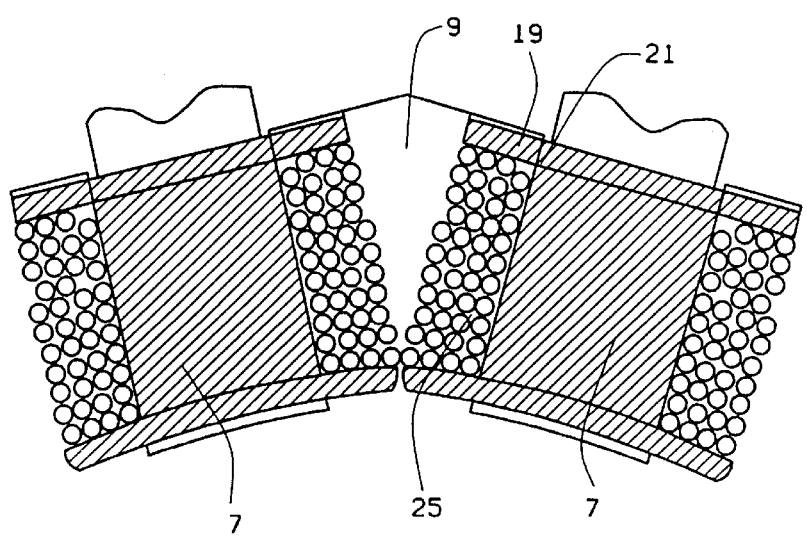
FIG. 2 is a sectional view, partly broken away, taken along the line 2—2 of FIG. 1, illustrating the slot fill characteristics of the stator assembly of FIG. 1.

Bobbins 15 conventionally are formed from suitable electrical insulation material. Bobbins 15 each have a sleeve 19 defining an opening 21 therethrough and a pair of spaced apart opposite flanges 23 and 23a, which are integrally provided on the sleeve. The flanges 23 and 23a extend generally axially outwardly of the sleeve 19. A preselected number of winding turns 17 are randomly or layer wound about sleeve 19 of bobbin 15 between opposite flanges 23 and 23a so as to form a concentrated winding pole 27. As shown in FIG. 2, the bobbin concept, even when layered windings are employed, has significantly low slot fill. Physically, use of bobbins prevents obtaining high slot fills because of the physical limitations of the slot 9 and the size of the bobbins themselves.

To some extent, slot fill for salient pole motors can be improved by the use of wind in place techniques, one illustrative embodiment of which is shown in FIG. 3. As there shown, a winding gun 30 has a tip 32 insertable in the slot 9 of the core 1. Use of a winding gun or needle such as that illustrated in FIG. 3, and similar wind in place techniques, are well known in the art. In general, the tip 32 of gun 30 traverses the height of the stator core 1 in an oscillatory manner, to lay the winding turn 17 in position along the slot 9. While it is possible to obtain higher slot fills with the wind in place technique shown in FIGS. 3, 4a, and 4b, in comparison to a bobbin winding, the slot fills still are low because the gun tip 32 traverses the slot 9 in order to position or place the winding about the respective tips 7. The wind in place technique also suffers as the number of poles increases. For any given stator size, the slot area for winding reception decreases as the number of poles increases. That is illustrated in FIGS. 4a and 4b, where 4a represents a six (6) pole construction and 4b represents a twelve (12) pole construction all in a standard 55 NEMA (National Electrical Manufacturer's Association) frame size. As illustrated, the slot area decreases substantially in the twelve pole design.

In addition to core slot fills, both bobbin and oscillating gun winders have inherent difficulties associated with them. Even what are considered high speed oscillating gun winders operate at what are relatively slow speeds as compared to other winding techniques. Bobbin winders, while they often have increased winding speeds, present difficulties in the physical handling of the bobbins That is to say, salient pole machines, by their nature, tend to be high or multiple pole motor designs. The physical handling of the bobbins often becomes a problem for motor manufacturers because of the number required for any particular motor design.

Figures 7, 8:
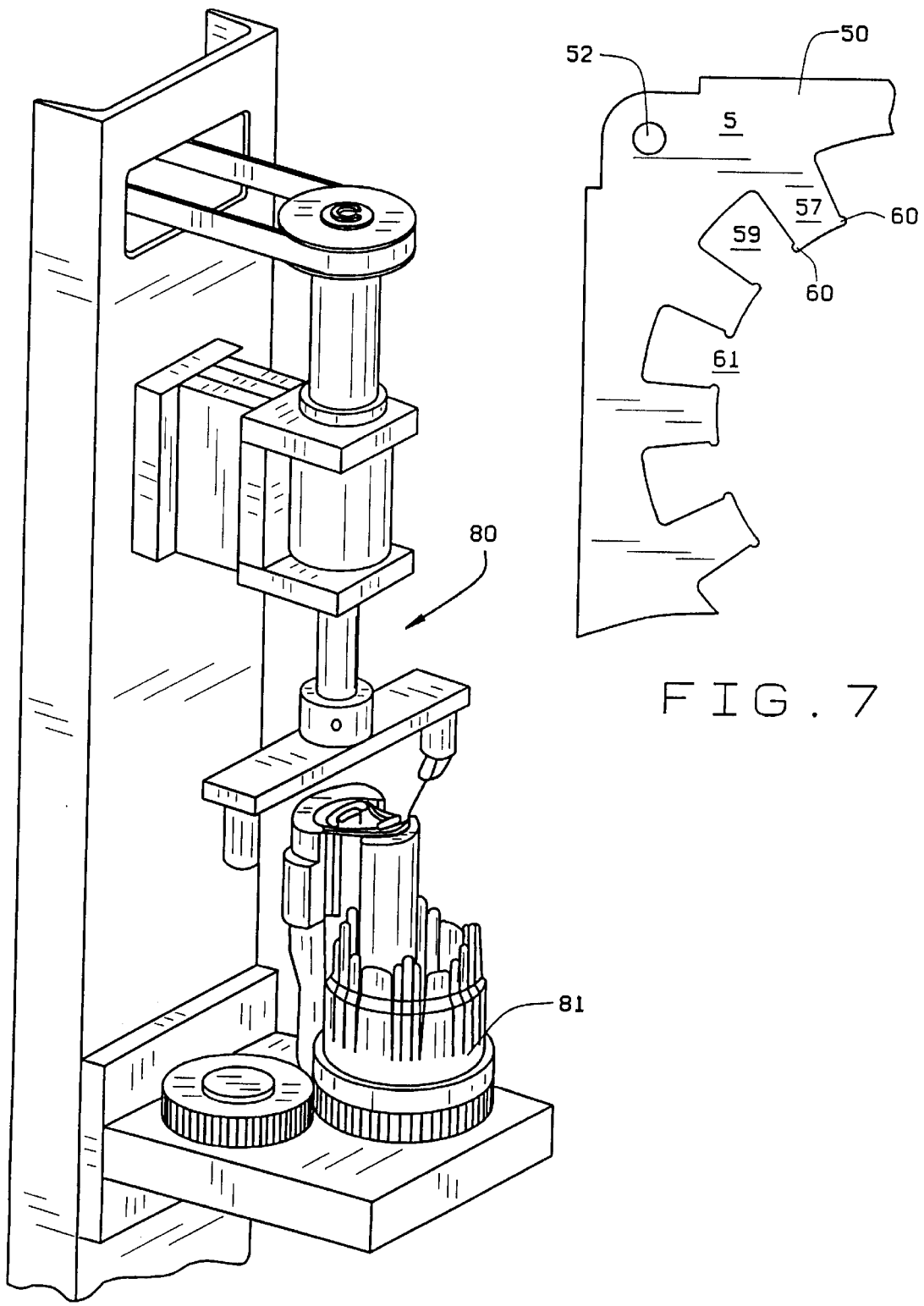
FIG. 7 is a sectional view, partly broken away, of one illustrative embodiment of a stator core employed in one form of our invention.
FIG. 8 is a view in perspective, partly broken away, of one illustrative method of forming salient poles externally of the motor.

Referring now to FIG. 7, a second illustrative core 50 used with the motor of the present invention is shown in greater detail. Like numerals are retained, where appropriate. As there shown, the core 50 includes a yoke 5 having a plurality of stator teeth 57 extending outwardly from the yoke 5. Adjacent teeth define slots 59. In comparing FIGS. 5 and 7, it may be noted that the teeth 57 of the core 50 have two tips 60 formed on them. The core 1 shown in FIG. 5 is similar to other prior art salient pole devices in that the teeth 7 are generally formed without the tooth tips 60. While either core construction is compatible with the broader aspects of our invention, the provision of the tips 60 in a salient pole motor of the present invention means that conventional insulation techniques, described hereinafter, may be employed with the motor of our invention. The core 50, in the embodiment illustrated, defines a bolt receiving opening 52 which is utilized to position the stator assembly of the present invention in its intended application. Conventionally, a plurality of the opening 52 are employed in applicational use. However, those skilled in the art will appreciate that the openings 52 may be eliminated in other embodiments of the invention.

Refer now to FIG. 8, a winding machine for winding individual salient poles externally of the stator core, is illustrated by the reference numeral 80. The winding machine 80 is shown and described in the above-referenced Kieffer U.S. Pat. No. 3,714,973 and is not described in detail. Those skilled in the art will recognize that the winding machine 80 also can be used to wind conventional distributed windings for ac induction motors. Because such machines are readily available, they easily are converted to wind salient poles, if desired, at high speed. That is to say, the winding speeds may approach 4,000 RPM, more than 10 times faster than the oscillating gun described in conjunction with FIG. 3. A feature of the winding machine 80 is the use of a transfer tool 81 which permits reception of the salient poles after winding, and allows the poles to be stored on the transfer tool 81. That is to say, transfer tool 81 may be removed from the winding machine 80 and the salient pole winding contained thereon positioned in the upper tooling 62 of a suitable axial insertion device, best shown in FIG. 5. In the particular embodiment of FIG. 5, the stator design has twelve (12) salient poles and those twelve poles may be wound, for example, on the transfer tool 81, and thereafter positioned on the upper tooling 62 of the axial insertion device 40. Thereafter, the stator core 1 is placed on the upper tooling 62 in a manner well known in the art, and the winding is axially inserted into the core 1 of the present invention.

Figure 9:
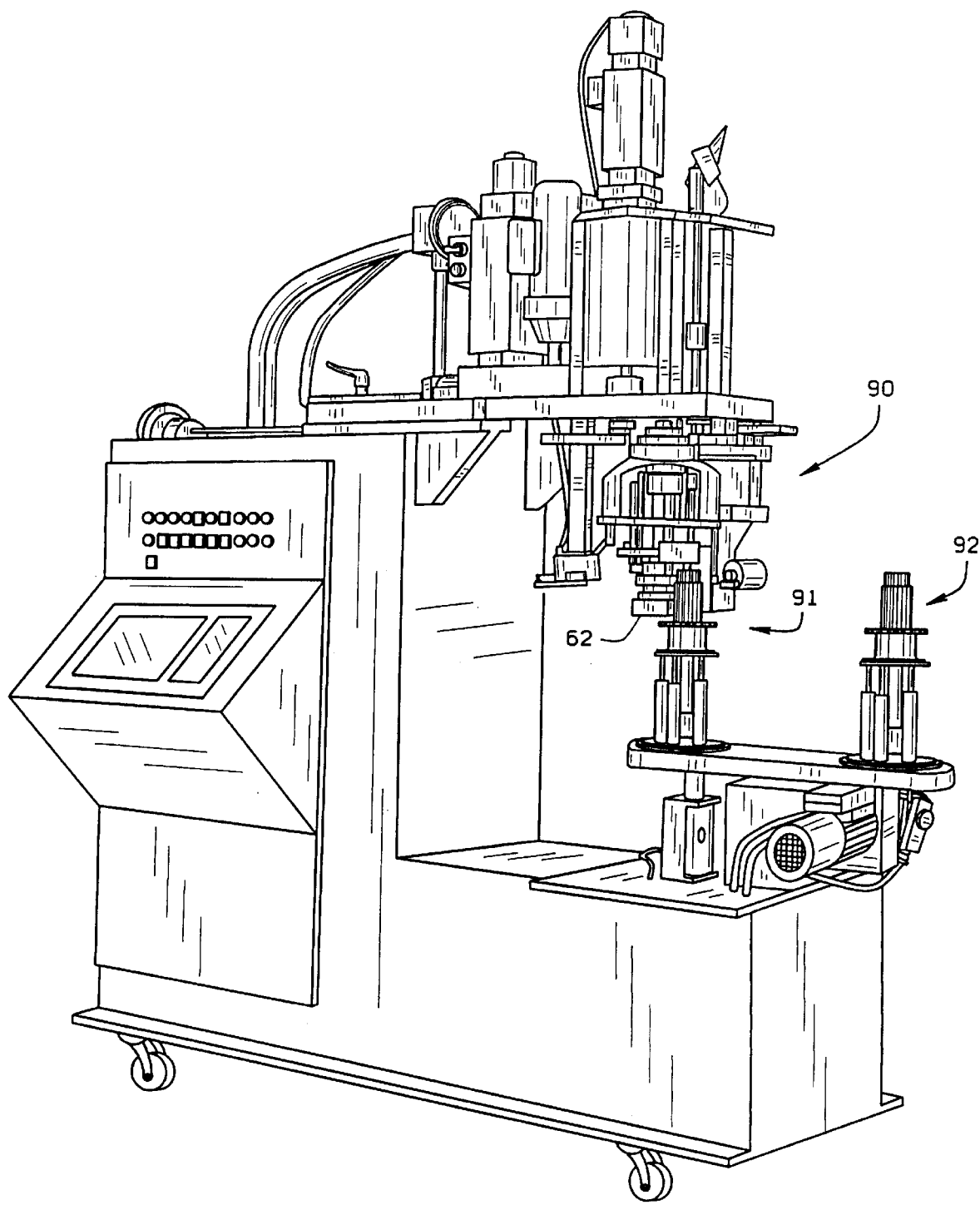
FIG. 9 is a view in perspective of the second illustrative embodiment of a device for forming salient poles externally of the motor.

In the alternative, automatic placement of the salient poles on the axial insertion apparatus may be utilized, if desired. Such an arrangement is illustrated in FIG. 9, where a two-position winding machine 90 provides a winding station 91 and a winding insertion station 92. The winding is formed and inserted on the upper tooling 62 of the axial insertion device at the station 91. Thereafter, the stations are rotated so that the station 91 assumes a station 92 position and the station 92 assumes the station 91 position. The stator core 1 is placed on the upper tooling 62 of the station position 92, and the winding is axially inserted at the station 92 while the succeeding salient pole winding is being formed at the station 91. Winders, similar to the winder 91, have provisions for automatically depositing the windings on the upper tooling 60 of the axial insertion device employed in conjunction with our invention. As will be appreciated by those skilled in the art, in the alternative, a winding tool may also be used with the winder 91, if desired.

Figure 6:
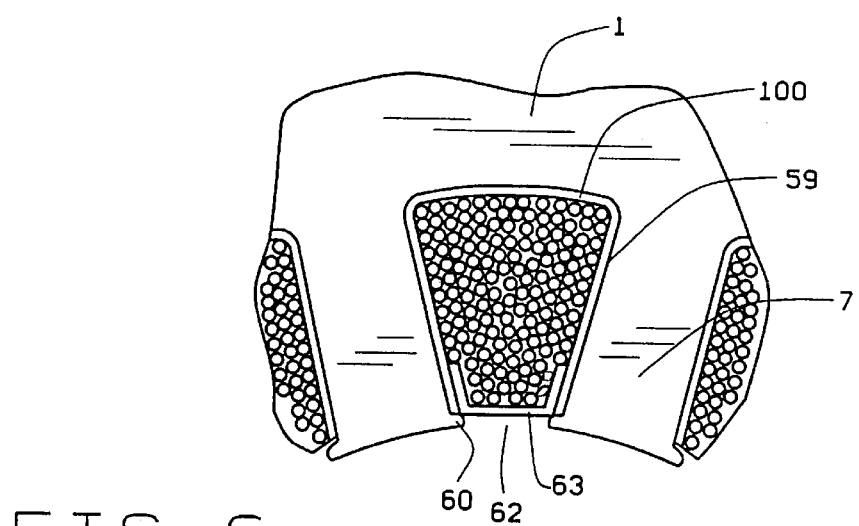
FIG. 6 is a diagrammatic view partly broken away illustrating the slot fill obtainable with the construction method of the present invention.
Figure 10:
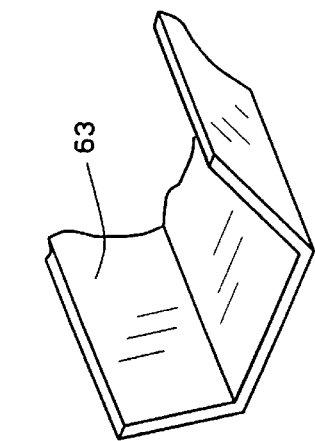
FIG. 10 is a view in perspective of part of the insulation employed with our invention.
Figure 11:
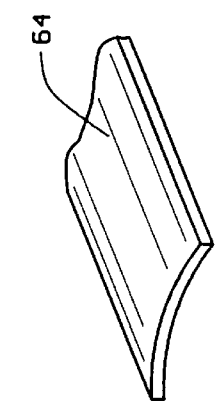
FIG. 11 is a view in perspective of additional portions of the insulation system employed with our invention.

Because we employ axial insertion in our construction method, we obtain slot fills substantially higher than the slot fills obtainable with other prior art techniques. For example, referring to FIGS. 6, 10 and 11, the slots 59 of the core 50 are illustrated as containing a slot insulation 100. As shown in FIG. 6, the adjacent teeth 7 (57) define a slot opening 61. In the embodiment illustrated, the slot opening 61 may be closed by an insulation wedge 63 if desired. In addition to or in place of the wedge 63, a top stick 64 may be used to close the opening 63. Top stick 64 preferably is constructed from ferromagnetic material similar to that employed for the individual laminations 3. Top stick 64 is conventional and may be formed by any convenient method. A conventional punch press works well, for example. The silhouette of top stick 64 with may vary and depends, as will be appreciated by those skilled in the art, on the lamination design with which the top stick 64 is used. As is known in the art, top stick 64 is used to close the winding receiving opening between the teeth 7.

Figure 12:
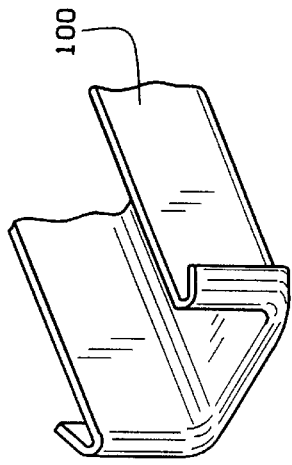
FIG. 12 is a diagrammatic view of one illustrative embodiment of the method of constructing a salient pole motor of our invention.
Figure 12:
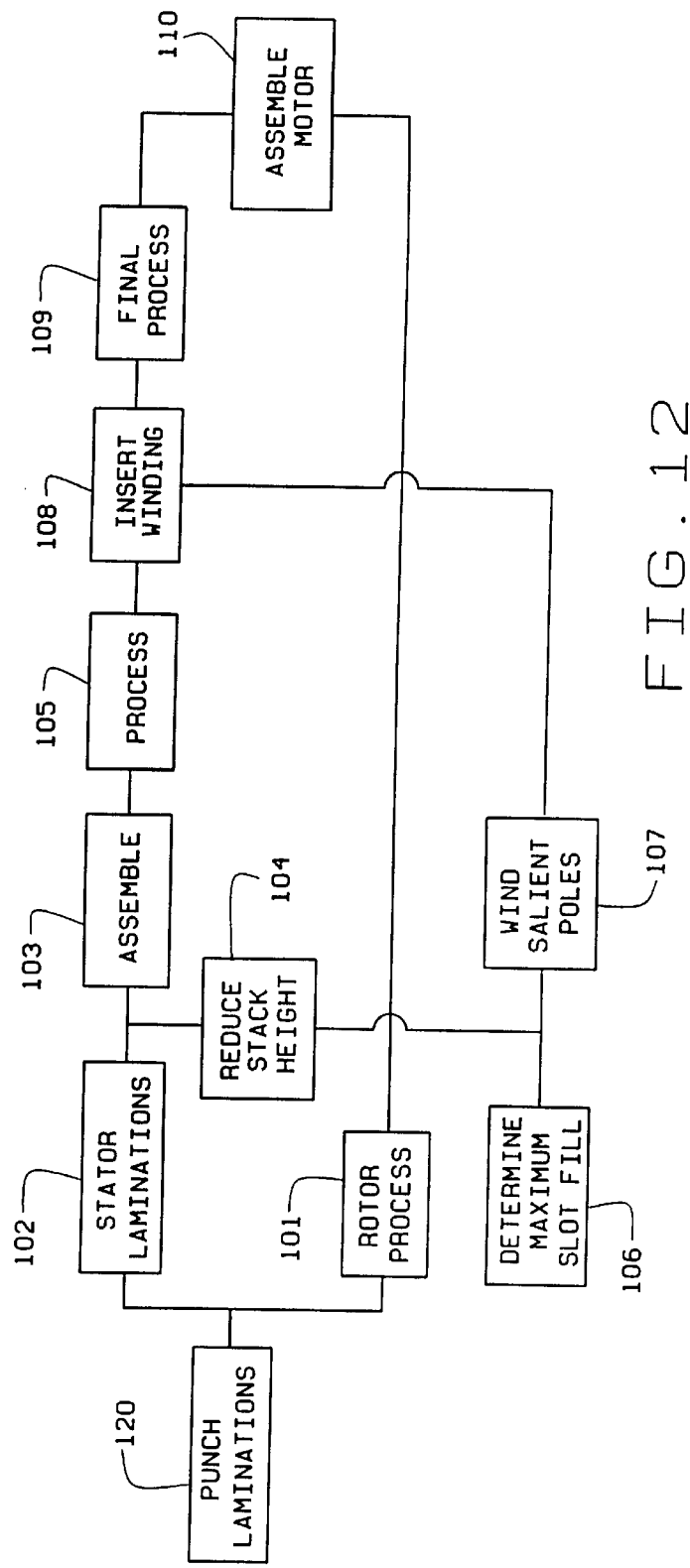

Referring now to FIG. 12, the preferred method of our invention is illustrated in block diagrammatic form. As there shown, laminations are processed in a step 120. Conventionally, laminations are constructed from punch presses employing progressive dies. Rotor and stator laminations are punched together, and the rotor laminations are separated from the stator laminations at the punch press.

Rotor lams are assembled in a rotor process 101, not described in detail. Rotor processing may employ any conventional techniques known to those skilled in the art. The stator laminations, after separation from the rotor laminations, are processed in a step 102. Individual laminations, for example, often are loosely stacked and annealed, or are combined in preselected stack heights. Of particular importance to the method of our invention is the reduction in stator core active material by reducing, for example, the stack height by the motor designer, shown in a step 104. After a minimum stack height is determined, the core is assembled in a step 103. Additional conventional processing on the core may be accomplished in a step 105.

As indicated above, in the alternative, stator active material also may be reduced by reducing the lamination size for a particular motor design. If flux densities in the core are maintained relatively constant, reducing motor lamination size results in small stator core slots. Assuming the same winding is employed, slot fill for the motor increases because of the smaller slot design of the lamination employed. Copper material employed in the motor will increase, however, because winding turn mean length increases, even if no additional winding turns are employed. Either method of increasing slot fill of the motor is intended to be included within the content of the step 104.

In conjunction with the reduction in stack height, maximum slot fill for the salient pole winding is determined in a step 106 and the winding is wound externally of the core in a step 107. Thereafter, the winding is inserted in the stator core by an axial insertion process in a step 108. The stator core then has final processing applied to it in a step 109. As will be appreciated by those skilled in the art, final processing can include blocking, and/or a conventional dip and bake process, all techniques well know to those skilled in the art. For example, various blocking techniques are described in U. S. Pat. No. 5,491,886, issued Feb. 20, 1996, and assigned to the Assignee of the present invention. The rotor or rotor assembly is combined with the stator assembly is a step 110 to produce a motor product for use in its intended application.

Numerous variations, within the scope of the appended claims, will be apparent to those skilled in the art in light of the foregoing description and accompanying drawings. For example, lamination design silhouette may be altered in other embodiments of this invention. Insulation techniques for the core may vary. The number of poles also may vary in other embodiments. Merely by way of example, the motor of this invention produced a substantial decrease in cost for ⅓ horsepower switched reluctance motor. The following costs were obtained.

| Wind in slot | | Wind/insert | |
|---|---|---|---|
| slot fill 50% | | slot fill 60% | |
| Stack length -- 50 mm | | Stack length -- 40 mm | |
| active material costs: | | active material costs: | |
| lamination steel | $5.05 | lamination steel | $4.03 |
| CU wire | $2.12 | CU wire | $2.42 |
| Total costs: | $7.18 | Total costs: | $6.46 | indicating a savings of $0.72. This result was based on copper wire cost per pound of $1.63, and a steel cost per pound of $0.27. The ability to obtain a lower cost motor by increasing the copper contained in the motor while decreasing the stack height for a salient pole winding is unexpected and surprising, and permits a motor manufacturer to provide a lower cost, easily reproducible motor.

Our method has another unexpected result in the final motor product, particularly in applications where positive air flow techniques are not commonly employed to reduce the operating temperatures of the motor. We have found, surprisingly, that the higher slot fills employed with our method of construction actually improves heat transfer from the windings, thereby improving the temperature rise and maximum winding temperature in operational use. Again, conventional logic suggests that air space and free air circulation in the slots of the stator core would be more beneficial to winding temperatures. We find the opposite to be true, and motors constructed in accordance to our method exhibit improved thermal efficiency and lower operating temperatures.

From the foregoing, it is apparent that a novel method of constructing a salient pole motor is disclosed for accomplishing the objectives set forth above, as well as others, and that changes in the precise arrangement, shapes and details, in addition to or in place of those previously described, may be made by those skilled in the art without departing from the scope of our invention.

Having thus described the invention, what is desired to be secured by Letters Patent is:

1. A method of constructing a salient pole motor having a stator core including a stack height, the stator core being formed from a plurality of laminations constructed from ferromagnetic material, individual laminations having outwardly extending teeth, and winding receiving slots between adjacent teeth, and a winding for the motor, comprising the steps of:

determining the intended electrical performance of the salient pole motor;

designing the physical characteristics of the core and the winding for the salient pole motor to provide high slot fills and reduced electrically active core material;

winding the salient pole winding externally of the stator core;

transferring the salient pole winding to an axial winding insertion device;

axially inserting the salient pole winding into the stator core.

2. The method of claim 1 wherein the step of providing high slot fills and reduced electrically active core material is accomplished by reducing the size of the laminations forming the stator core.

3. The method of claim 1 further including the steps of insulating the slots of the stator core prior to winding insertion.

4. The method of claim 3 further including the step of forming the individual lamination teeth with tooth tips.

5. The method of claim 4 further including the steps of inserting insulation wedges with the winding.

6. The method of claim 4 wherein said core has a central axis, further including the steps of forming the laminations of said core with teeth extending radially outwardly of said central axis.

7. The method of claim 4 further including the steps of immersing at least said stator core in an epoxy material.

8. The method of claim 5 further including blocking the winding into a predetermined configuration.

9. The method of claim 8 further including the steps of placing phase insulation between adjacent coils in shared slots.

10. The method of claim 9 further including insertion of top sticks to close said slots.

11. The method of claim 10 wherein said top sticks are constructed from ferromagnetic material.

12. The method of claim 1 wherein said transferring the salient pole winding to an axial insertion device comprises the steps of:
   placing the winding on a winding transfer tool; and
   transferring the winding from said winding transfer tool to the axial winding insertion device.

13. The method of claim 12 further including the steps of storing the windings on said transfer tool.

14. A method of constructing a salient pole motor including a stator core having a stack height, the stator core having a central axis and being formed from a plurality of laminations, individual laminations being constructed from a ferromagnetic material, the laminations defining radially extending teeth and winding receiving slots between the teeth, comprising the steps of:
   establishing the electrical performance of the salient pole motor required for its intended application;
   designing the physical characteristic of the core so that the core stack height approaches a minimum stack height while the number of winding turns approaches a maximum slot fill for the established electrical performance;
   winding the salient pole winding configuration externally of the stator core;
   transferring the salient pole winding to an axial winding insertion machine;
   positioning the stator core properly with respect to said winding; and
   axially inserting the salient pole winding into said stator core.

15. The method of claim 14 wherein said winding is wound on a high speed winding machine which winds in excess of four thousand revolutions per minute.

16. The method of claim 14 further including the steps of insulating the slots of the stator core prior to winding insertion.

17. The method of claim 16 further including the step of forming the individual lamination teeth with tooth tips.

18. The method of claim 17 further including the steps of inserting insulation wedges with the winding.

19. The method of claim 18 further including blocking the winding into a predetermined configuration.

20. The method of claim 19 further including the steps of placing phase insulation between adjacent coils in shared slots.

21. The method of claim 20 further including insertion of top sticks to close set slots.

22. The method of claim 21 wherein said top sticks are constructed from ferromagnetic material.

23. The method of claim 14 wherein said transferring the salient pole winding to an axial insertion device comprises the steps of:
   placing the winding on a winding transfer tool; and
   transferring the winding from said winding transfer tool to the axial winding insertion device.

24. The method of claim 23 further including the steps of storing the windings on said transfer tool.

25. The method of claim 24 wherein said core has a central axis, further including the steps of forming the laminations of said core with teeth extending radially outwardly of said central axis.

26. The method of claim 24 further including the steps of immersing at least said stator core in an epoxy material.

27. A method of constructing a salient pole motor having a stator core defining winding receiving slots, the slots having a predetermined area for receiving a winding, and a winding in the slots, the motor having a slot fill determined by dividing the area containing the winding in a particular slot by the area of that slot, comprising the steps of:
   determining the electrical performance requirements of the stator of the salient pole motor for its intended application;
   punching a plurality of laminations from suitable ferromagnetic material, each lamination having a yoke portion and a plurality of teeth extending outwardly from said yoke, said teeth defining the winding receiving slots;
   designing the physical characteristics of the core so that the core electrically active material approaches a minimum for the established electrical performance;
   assembling the laminations into a stator core;
   designing the salient pole winding so that the slot fill for the winding receiving slots approaches a maximum slot fill for the determined electrical performance requirements;
   winding the salient pole winding formlessly externally of the stator core;
   transferring the formlessly wound salient pole winding to an axial winding insertion apparatus;
   positioning the stator core with respect to said winding; and
   axially inserting the salient pole winding into said stator core.

28. The method of claim 27 wherein the step of designing the physical characteristics of the core includes reducing the number of laminations employed in the core.

29. A method of constructing the stator assembly of a salient pole motor, comprising the steps of:
   punching a plurality of laminations from suitable ferromagnetic material, each lamination having a yoke portion and a plurality teeth extending outwardly from said yoke, said teeth defining winding receiving slots;
   matching the electrical performance requirements of the salient pole motor for its intended application by reducing the number of laminations required for the core stack height and increasing the number of winding turns of the respective salient poles;
   assembling the stator laminations into a stator core;
   winding the salient pole winding externally of the stator core;
   positioning the winding on an axial winding insertion device;
   positioning the core or said axial insertion device; and
   axially inserting the salient pole winding into the core.

30. A method of constructing a salient pole motor, the motor including a stator assembly including a stator core comprising the steps of:
   winding a salient pole winding configuration externally of the stator; and
   axially inserting the salient pole winding into the stator core.

31. The method of claim 30 further comprising the step of transferring the salient pole winding to an axial winding inserter.

32. The method of claim 31 wherein the stator core includes a plurality of laminations defining electrically active material further comprising the step of designing the physical characteristics of the stator core to provide reduced electrically active material.

33. The method of claim 32 further comprising the step of designing the physical characteristics of the stator core to provide high slot fill.

34. The method of claim 33 wherein the step of reducing electrically active stator core material comprises reducing the stator core height.

* * * * *